(12) United States Patent
Cheng et al.

(10) Patent No.: US 8,791,919 B2
(45) Date of Patent: Jul. 29, 2014

(54) AUTOSTEREOSCOPIC DISPLAY DEVICE HAVING TOUCH SENSING MECHANISM AND DRIVING METHOD THEREOF

(75) Inventors: Hsiao-Chung Cheng, Hsin-Chu (TW); Jen-Chieh Chen, Hsin-Chu (TW); Tzu-Hsien Chuang, Hsin-Chu (TW); Ming-Sheng Lai, Hsin-Chu (TW); Shih-Hsiung Huang, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 53 days.

(21) Appl. No.: 13/455,143

(22) Filed: Apr. 25, 2012

(65) Prior Publication Data

US 2013/0033440 A1 Feb. 7, 2013

(30) Foreign Application Priority Data

Aug. 4, 2011 (TW) .............................. 100127769 A

(51) Int. Cl.
*G06F 3/041* (2006.01)
(52) U.S. Cl.
USPC ................ 345/173; 345/42; 349/15; 359/462
(58) Field of Classification Search
CPC ................................. H04N 13/04; G06F 3/041
See application file for complete search history.

(56) References Cited

U.S. PATENT DOCUMENTS

| 6,014,164 | A | 1/2000 | Woodgate |
| 6,816,158 | B1 | 11/2004 | Lemelson |
| 7,244,901 | B1 | 7/2007 | Liao |
| 7,864,503 | B2 | 1/2011 | Chang |
| 8,229,510 | B2 * | 7/2012 | Lin et al. ........................ 455/566 |
| 8,587,556 | B2 * | 11/2013 | Luo ................................ 345/174 |
| 2008/0266387 | A1 * | 10/2008 | Krijn et al. ....................... 348/51 |
| 2009/0046143 | A1 * | 2/2009 | Hiddink et al. ................. 348/59 |
| 2009/0284456 | A1 | 11/2009 | Song |
| 2010/0026616 | A1 | 2/2010 | Okada |
| 2010/0091204 | A1 | 4/2010 | Chen |
| 2010/0118218 | A1 * | 5/2010 | Eichenlaub ..................... 349/15 |
| 2011/0109622 | A1 | 5/2011 | Son |
| 2012/0038690 | A1 * | 2/2012 | Lee .............................. 345/691 |

FOREIGN PATENT DOCUMENTS

| CN | 101331777 A | 12/2008 |
| CN | 101587692 A | 11/2009 |
| CN | 101645250 A | 2/2010 |
| CN | 102062965 A | 5/2011 |
| TW | 201015204 | 4/2010 |

* cited by examiner

*Primary Examiner* — Joe H Cheng
*Assistant Examiner* — Yaron Cohen
(74) *Attorney, Agent, or Firm* — Winston Hsu; Scott Margo

(57) ABSTRACT

An autostereoscopic display device having touch sensing mechanism includes a display panel for illustrating images, a touch sensing panel for detecting touch events, a 2D/3D switching panel disposed between the display panel and the touch sensing panel, and a control unit. The 2D/3D switching panel has a substrate, a first electrode disposed on the substrate, a counter substrate, and a second electrode disposed on the counter substrate. The control unit is employed to provide a first control signal and a second control signal furnished to the first electrode and the second electrode respectively. The first control signal is switched between a first high voltage and a first low voltage in a gradual-shift manner. The second control signal is switched between a second high voltage and a second low voltage in a gradual-shift or rapid-shift manner.

13 Claims, 5 Drawing Sheets

AUTOSTEREOSCOPIC DISPLAY DEVICE HAVING TOUCH SENSING MECHANISM AND DRIVING METHOD THEREOF

BACKGROUND OF THE INVENTION

1. Technical Field

The disclosure relates to a display device and driving method thereof, and more particularly, to an autostereoscopic display device having touch sensing mechanism and driving method thereof.

2. Description of the Related Art

In recent years, various stereoscopic display modes have been developed to make an observer obtain stereoscopic sense, which is achieved by providing different images individually to the left and right eyes of the observer so that the brain of the observer is able to analyze the overlapping images and identify the depth and gradation of each component to obtain stereoscopic sense. In general, stereoscopic display devices may be classified into passive stereoscopic display devices and autostereoscopic display devices. While using a passive stereoscopic display device, the observer should wear certain assisting equipment, for example, polarization glasses or shutter glasses. However, while using an autostereoscopic display device, the observer is not required to wear any assisting equipment because separated images for obtaining stereoscopic sense are provided by a build-in image separation panel thereof, making application of the autostereoscopic display device increasingly widespread. Besides, along with the requirement of a friendly communication interface for a user to interact with an electronic device, a touch-sensitive display device for controlling operations of the electronic device, instead of using a keyboard or a mouse, has steadily become the mainstream. The touch-sensitive display device may employ a resistive touch panel or a capacitive touch panel to sense touch inputs. The resistive touch panel locates touch input positions through voltage drops, but is unable to provide multitouch input functionality. The capacitive touch panel typically includes sensing capacitors, and performs signal processing on capacitance variations of the sensing capacitors corresponding to touch points for locating touch input positions, which is able to provide multitouch input functionality, thereby gaining increasing popularity.

In view of that, the autostereoscopic display device having touch sensing mechanism normally includes an image separation panel and a capacitive touch panel attached thereon. The image separation panel has a substrate, a counter substrate, a liquid crystal layer sandwiched between two said substrates, a first electrode disposed on the substrate for receiving a first control signal, and a second electrode disposed on the counter substrate for receiving a second control signal. The polarity of the first control signal relative to the second control signal should be inverted periodically for protecting the liquid crystal layer from causing permanent deterioration due to polarization. Regarding the prior-art method of driving the image separation panel, while the first control signal is switched from a first low voltage to a first high voltage in a rapid-shift manner, the second control signal is switched from a second low voltage to a second high voltage in a rapid-shift manner. In order to provide the polarity inversion operation for protecting the liquid crystal layer, the first low voltage is less than the second low voltage and the first high voltage is greater than the second high voltage, i.e. the first and second control signals are in phase with each other. Accordingly, the first high voltage is much higher than the first low voltage, such that the sensing operation of the capacitive touch panel is likely to be seriously interfered by an occurrence of transient alternating electric field resulting from the switching of the first control signal, which may incur a touch misjudgment event due to an error output signal of the capacitive touch panel and, in turn, results in malfunction of backend circuit.

SUMMARY

In accordance with an embodiment of the present invention, an autostereoscopic display device having touch sensing mechanism is provided for avoiding an occurrence of serious transient alternating electric field capable of interfering with the operation of touch sensing mechanism. The autostereoscopic display device comprises a display panel for illustrating images, a touch sensing panel for detecting touch events, a 2D/3D switching panel disposed between the display panel and the touch sensing panel, and a control unit. The 2D/3D switching panel has a first substrate, a first electrode disposed on the first substrate, a second substrate opposing to the first substrate, and a second electrode disposed on the second substrate. The control unit, electrically connected to the first and second electrodes, is utilized for providing a first control signal and a second control signal furnished to the first and second electrodes respectively according to a driving method. The first control signal is switched between a first high voltage and a first low voltage in a gradual-shift manner. The second control signal is switched between a second high voltage and a second low voltage in a gradual-shift or rapid-shift manner.

In accordance with another embodiment of the present invention, an autostereoscopic display device having touch sensing mechanism is provided for avoiding an occurrence of serious transient alternating electric field capable of interfering with the operation of touch sensing mechanism. The autostereoscopic display device comprises a display panel for illustrating images, a touch sensing panel for detecting touch events, a 2D/3D switching panel disposed between the display panel and the touch sensing panel, and a control unit. The 2D/3D switching panel has a first substrate, a first electrode disposed on the first substrate, a second substrate opposing to the first substrate, and a second electrode disposed on the second substrate. The control unit, electrically connected to the first and second electrodes, is utilized for providing a first control signal and a second control signal having a phase opposite to the first control signal which are furnished to the first and second electrodes respectively according to another driving method. The first control signal is switched between a first high voltage and a first low voltage in a rapid-shift manner. The second control signal is switched between a second high voltage and a second low voltage in a rapid-shift manner.

These and other objectives of the present invention will no doubt become obvious to those of ordinary skill in the art after reading the following detailed description of the preferred embodiment that is illustrated in the various figures and drawings.

DETAILED DESCRIPTION

Hereinafter, some embodiments of the present invention will be described in detail with reference to the accompanying drawings. Here, it is to be noted that the present invention is not limited thereto.

Figure 1:
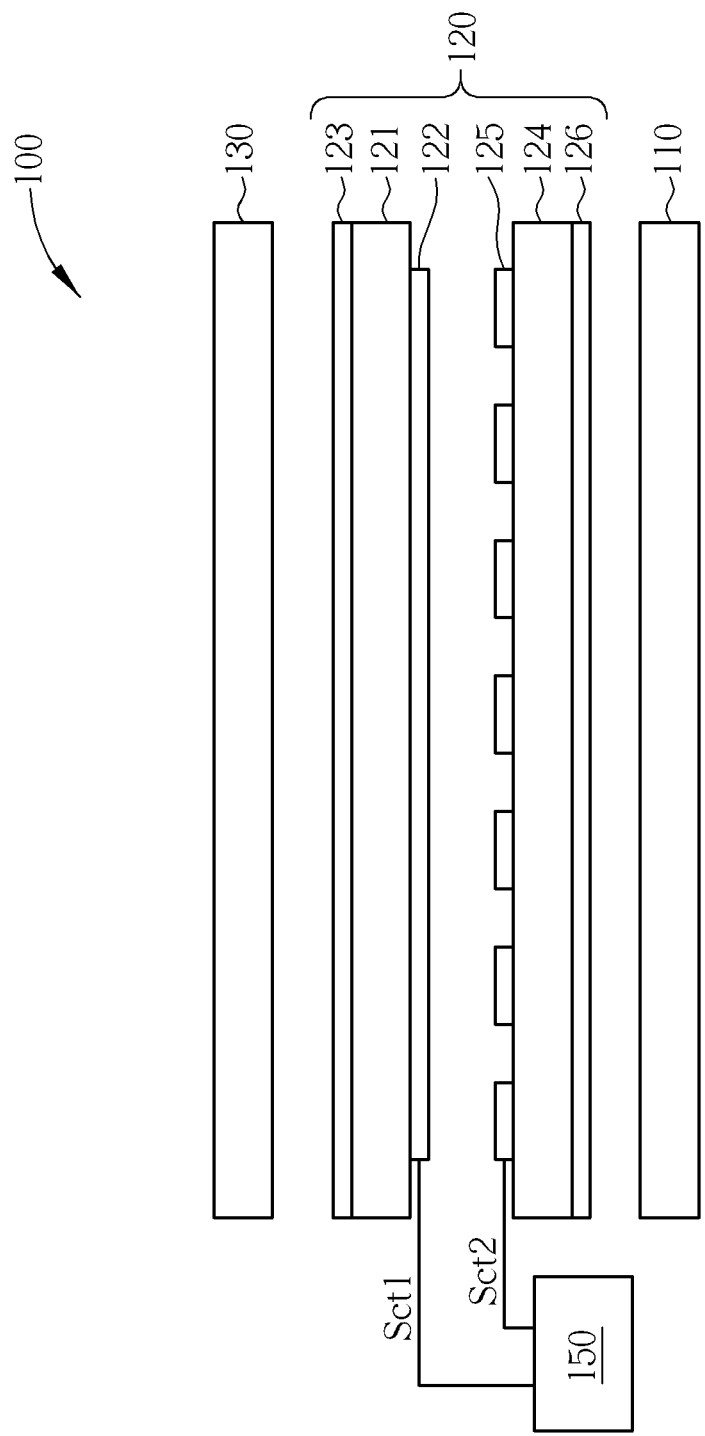
FIG. 1 is a structural diagram schematically showing an autostereoscopic display device having touch sensing mechanism in accordance with a first embodiment of the present invention.

FIG. 1 is a structural diagram schematically showing an autostereoscopic display device 100 having touch sensing mechanism in accordance with a first embodiment of the present invention. As shown in FIG. 1, the autostereoscopic display device 100 comprises a display panel 110, a 2D/3D switching panel 120, a touch sensing panel 130, and a control unit 150. The display panel 110 is employed to illustrate images. The touch sensing panel 130 is employed to detect touch events. The 2D/3D switching panel 120, disposed between the display panel 110 and the touch sensing panel 130, is utilized for performing a 2D/3D display-mode switching operation according to a first control signal Sct1 and a second control signal Sct2. The control unit 150, electrically connected to the 2D/3D switching panel 120, is put in use for providing the first control signal Sct1 and the second control signal Sct2. In one embodiment, the first control signal Sct1 is switched between high/low voltage levels based on a gradual-shift manner, and the second control signal Sct2 is switched between high/low voltage levels based on a gradual-shift or rapid-shift manner. In another embodiment, the phase of the second control signal Sct2 is opposite to that of the first control signal Sct1, and both the first control signal Sct1 and the second control signal Sct2 are switched between high/low voltage levels based on a rapid-shift manner.

In the embodiment shown in FIG. 1, the 2D/3D switching panel 120 comprises a first substrate 121, a first electrode 122, a first polarizer 123, a second substrate 124, a second electrode 125, and a second polarizer 126. The first electrode 122 and the second electrode 125 are transparent conductive electrodes formed by indium tin oxide (ITO) material or other transparent conductive material. The first electrode 122 and the first polarizer 123 are respectively disposed on the first and second panel surfaces of the first substrate 121. The second electrode 125 and the second polarizer 126 are respectively disposed on the first and second panel surfaces of the second substrate 124. When the 2D/3D switching panel 120 is employed to operate a 3D display mode according to the first control signal Sct1 and the second control signal Sct2, the functionality of the 2D/3D switching panel 120 is substantially equivalent to that of a parallax barrier capable of performing an image separating operation for providing separated images individually to the left and right eyes of an observer for obtaining stereoscopic sense.

Figure 2:
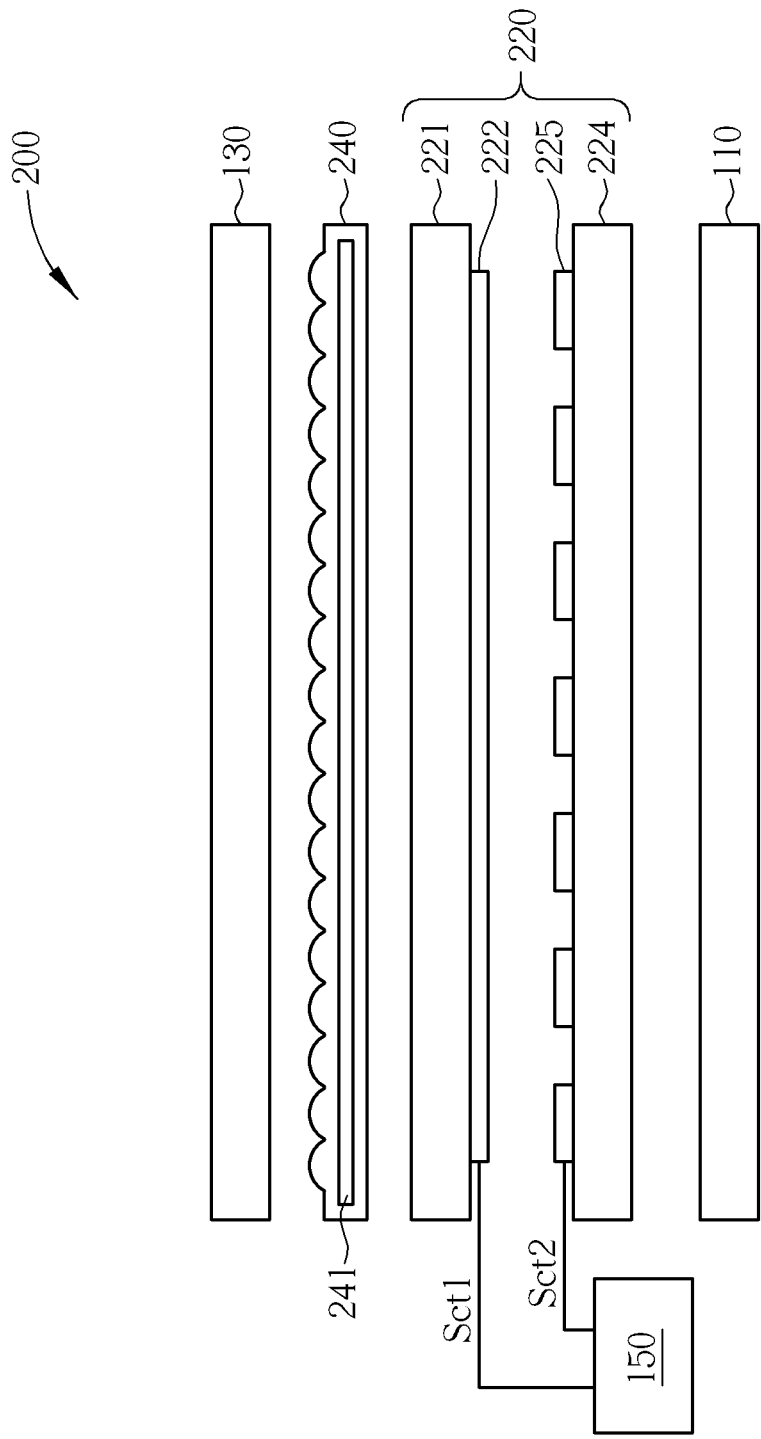
FIG. 2 is a structural diagram schematically showing an autostereoscopic display device having touch sensing mechanism in accordance with a second embodiment of the present invention.

FIG. 2 is a structural diagram schematically showing an autostereoscopic display device 200 having touch sensing mechanism in accordance with a second embodiment of the present invention. As shown in FIG. 2, the autostereoscopic display device 200 is similar to the autostereoscopic display device 100 illustrated in FIG. 1, differing in that the 2D/3D switching panel 120 is replaced with a 2D/3D switching panel 220, and a lenticular lens panel 240 with a liquid crystal polymer (LCP) layer 241 is further added. The lenticular lens panel 240 is disposed between the touch sensing panel 130 and the 2D/3D switching panel 220. The 2D/3D switching panel 220 comprises a first substrate 221, a first electrode 222 disposed on the first substrate 221, a second substrate 224, and a second electrode 225 disposed on the second substrate 224. The first electrode 222 and the second electrode 225 are transparent conductive electrodes formed by ITO material or other transparent conductive material. The first electrode 222 is electrically connected to the control unit 150 for receiving the first control signal Sct1. The second electrode 225 is electrically connected to the control unit 150 for receiving the second control signal Sct2. It is noted that the 2D/3D switching panel 220 is similar to the 2D/3D switching panel 120, differing primarily in that the first polarizer 123 and the second polarizer 126 are omitted. The lenticular lens panel 240 and the 2D/3D switching panel 220 co-act to perform a 2D/3D display-mode switching operation. Besides, the lenticular lens panel 240 together with the 2D/3D switching panel 220 may be employed to set a 3D display mode in a local screen area according to the first control signal Sct1 and the second control signal Sct2. Further, the lenticular lens panel 240 together with the 2D/3D switching panel 220 may be employed to set a 2D display mode having high screen resolution according to the first control signal Sct1 and the second control signal Sct2.

Figure 3:
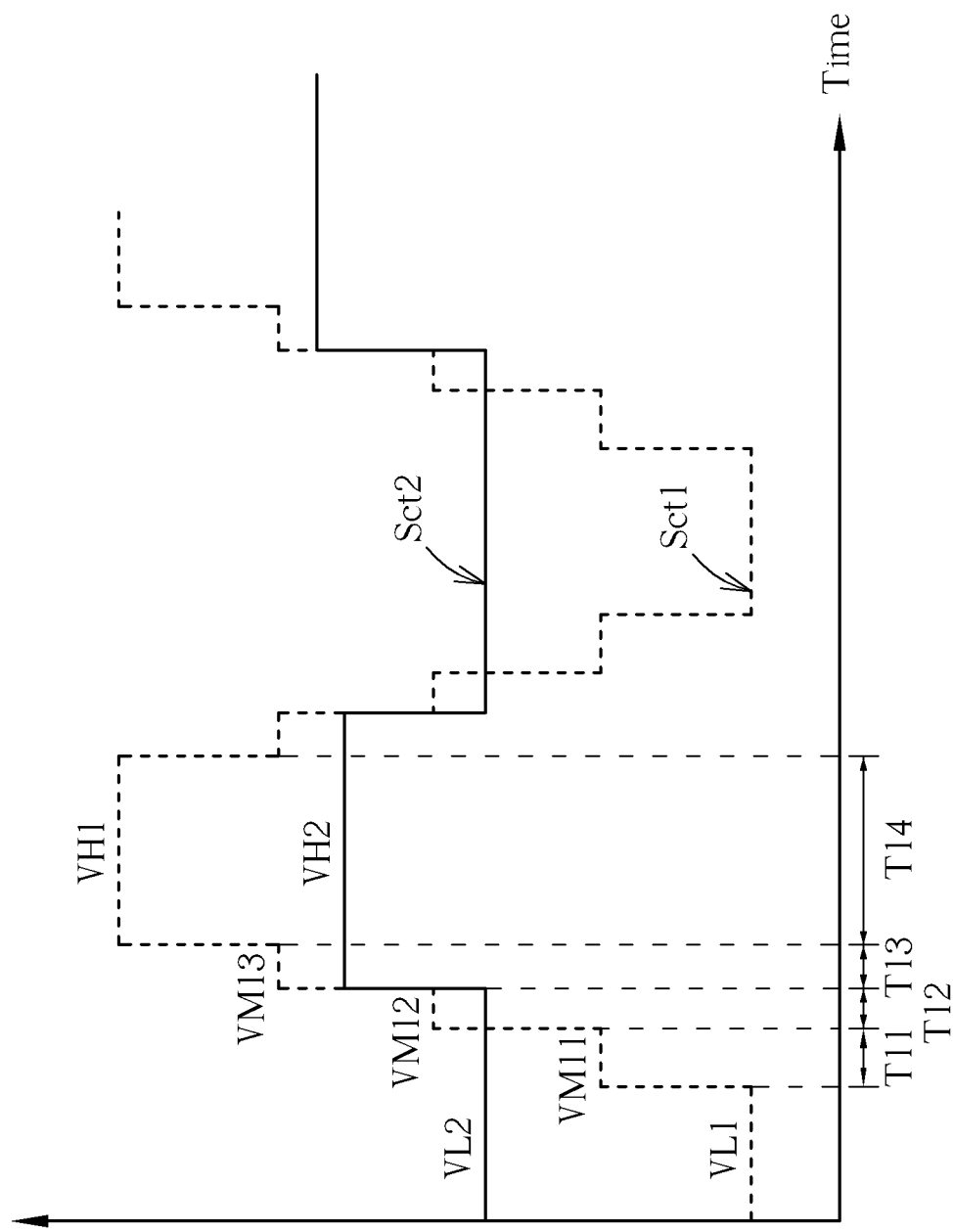
FIG. 3 is a schematic diagram showing the waveforms of the first control signal Sct1 and the second control signal Sct2 generated by the control unit illustrated in FIG. 1 and FIG. 2 based on a first driving method of the present invention, having time along the abscissa.

FIG. 3 is a schematic diagram showing the waveforms of the first control signal Sct1 and the second control signal Sct2 generated by the control unit 150 illustrated in FIG. 1 and FIG. 2 based on a first driving method of an embodiment of the present invention, having time along the abscissa. As shown in FIG. 3, during an interval T11, the control unit 150 pulls the first control signal Sct1 from a first low voltage VL1 upward to a first intermediate voltage VM11 between the first low voltage VL1 and a first high voltage VH1. During an interval T12, the control unit 150 pulls the first control signal Sct1 from the first intermediate voltage VM11 upward to a second intermediate voltage VM12 between the first intermediate voltage VM11 and the first high voltage VH1. During an interval T13, the control unit 150 pulls the first control signal Sct1 from the second intermediate voltage VM12 upward to a third intermediate voltage VM13 between the second intermediate voltage VM12 and the first high voltage VH1. Also, the control unit 150 pulls the second control signal Sct2 from a second low voltage VL2 upward to a second high voltage VH2 during the interval T13. During an interval T14, the control unit 150 pulls the first control signal Sct1 from the third intermediate voltage VM13 upward to the first high voltage VH1.

That is, in the operation of the control unit 150 based on the first driving method, the first control signal Sct1 is gradually shifted from the first low voltage VL1 to the first high voltage VH1 via the intermediate voltages VM11-VM13, and an occurrence of serious transient alternating electric field capable of interfering with the operation of the touch sensing panel 130 is avoided, such that the touch sensing panel 130 is able to perform a high-reliable touch event detecting operation regardless of whether the first high voltage VH1 is much higher than the first low voltage VL1. It is noted that the first control signal Sct1 is not limited to be switched via the intermediate voltages VM11-VM13 and may be switched via more or fewer intermediate voltages. In one embodiment, the control unit 150 may assign plural intermediate voltages required for performing the voltage switching of the first control signal Sct1 according to the difference between the first high voltage VH1 and the first low voltage VL1. Depending on the performance of liquid crystals, the polarity inversion operation can be performed in either blanking time or other time.

Figure 4:
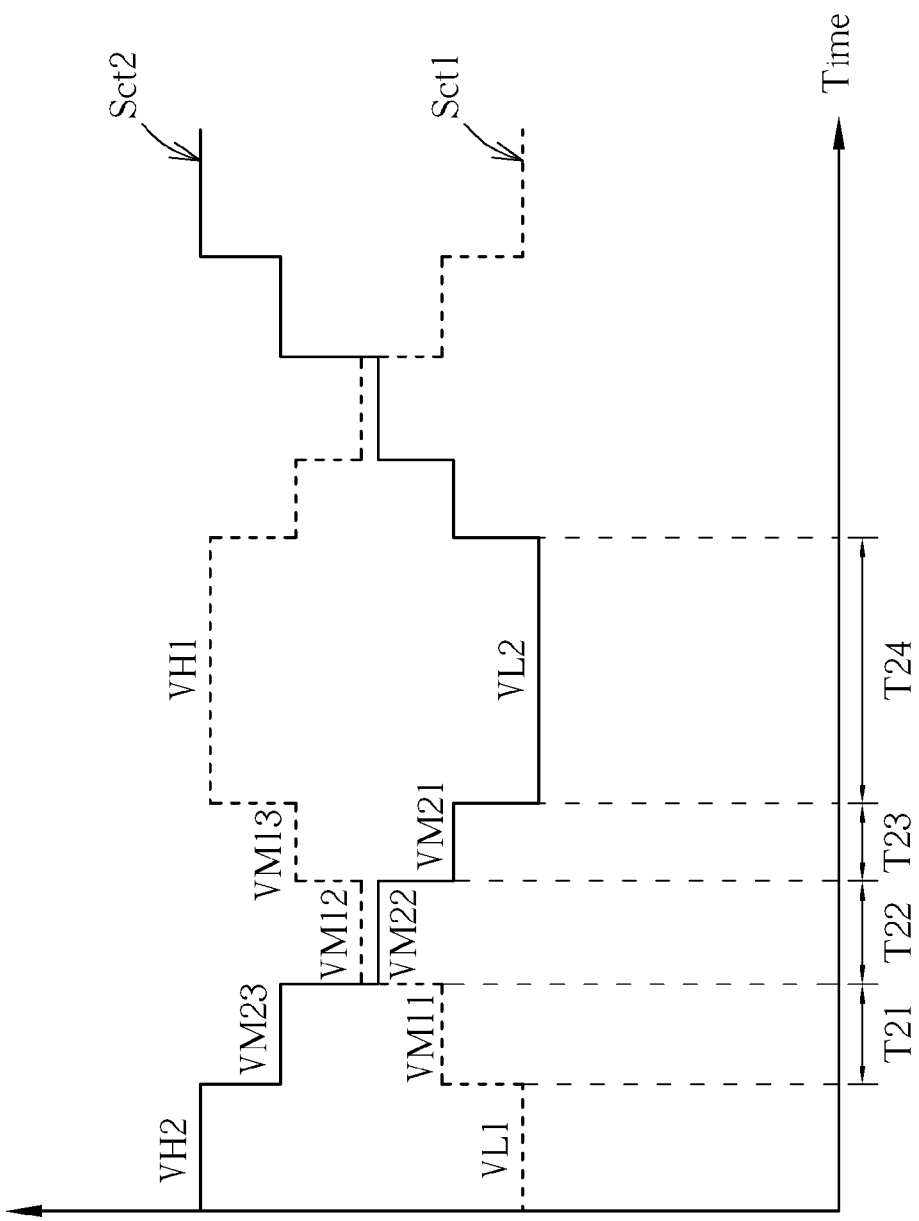
FIG. 4 is a schematic diagram showing the waveforms of the first control signal Sct1 and the second control signal Sct2 generated by the control unit illustrated in FIG. 1 and FIG. 2 based on a second driving method of the present invention, having time along the abscissa.

FIG. 4 is a schematic diagram showing the waveforms of the first control signal Sct1 and the second control signal Sct2 generated by the control unit 150 illustrated in FIG. 1 and FIG. 2 based on a second driving method of the present invention, having time along the abscissa. As shown in FIG. 4, during an interval T21, the control unit 150 pulls the first control signal Sct1 from a first low voltage VL1 upward to a first intermediate voltage VM11 between the first low voltage VL1 and a first high voltage VH1. Also, the control unit 150 pulls the second control signal Sct2 from a second high voltage VH2 downward to a third intermediate voltage VM23 between the second high voltage VH2 and a second low voltage VL2 during the interval T21. During an interval T22, the control unit 150 pulls the first control signal Sct1 from the first intermediate voltage VM11 upward to a second intermediate voltage VM12 between the first intermediate voltage VM11 and the first high voltage VH1. Further, the control unit 150 pulls the second control signal Sct2 from the third intermediate voltage VM23 downward to a second intermediate voltage VM22 between the third intermediate voltage VM23 and the second low voltage VL2 during the interval T22.

During an interval T23, the control unit 150 pulls the first control signal Sct1 from the second intermediate voltage VM12 upward to a third intermediate voltage VM13 between the second intermediate voltage VM12 and the first high voltage VH1. In addition, the control unit 150 pulls the second control signal Sct2 from the second intermediate voltage VM22 downward to a first intermediate voltage VM21 between the second intermediate voltage VM22 and the second low voltage VL2 during the interval T23. During an interval T24, the control unit 150 pulls the first control signal Sct1 from the third intermediate voltage VM13 upward to the first high voltage VH1. Also, the control unit 150 pulls the second control signal Sct2 from the first intermediate voltage VM21 downward to the second low voltage VL2 during the interval T24. In the embodiment shown in FIG. 4, the second high voltage VH2 may be substantially identical to the first high voltage VH1, the second low voltage VL2 may be substantially identical to the first low voltage VL1, the first intermediate voltage VM21 may be substantially identical to the first intermediate voltage VM11, the second intermediate voltage VM22 may be substantially identical to the second intermediate voltage VM12, and the third intermediate voltage VM23 may be substantially identical to the third intermediate voltage VM13.

That is, in the operation of the control unit 150 based on the second driving method, when the first control signal Sct1 is gradually shifted from the first low voltage VL1 to the first high voltage VH1 via the intermediate voltages VM11-VM13, the second control signal Sct2 is also gradually shifted from the second high voltage VH2 to the second low voltage VL2 via the intermediate voltages VM23-VM21. Therefore, an occurrence of serious transient alternating electric field capable of interfering the operation of the touch sensing panel 130 is avoided, and the touch sensing panel 130 is able to perform a high-reliable touch event detecting operation. Besides, since the phase of the second control signal Sct2 is opposite to that of the first control signal Sct1, the voltage swings of the first control signal Sct1 and the second control signal Sct2 may be significantly reduced for further mitigating the interference with the operation of the touch sensing panel 130 as well as for saving power consumption.

It is noted that the first control signal Sct1 is not limited to be switched via the intermediate voltages VM11-VM13 and may be switched via more or fewer intermediate voltages. Also, the second control signal Sct2 is not limited to be switched via the intermediate voltages VM21-VM23 and may be switched via more or fewer intermediate voltages. In one embodiment, the control unit 150 may assign plural intermediate voltages required for performing the voltage switching of the first control signal Sct1 according to the difference between the first high voltage VH1 and the first low voltage VL1. Further, the control unit 150 may assign plural intermediate voltages required for performing the voltage switching of the second control signal Sct2 according to the difference between the second high voltage VH2 and the second low voltage VL2. Depending on the performance of liquid crystals, the polarity inversion operation can be performed in either blanking time or other time.

Figure 5:
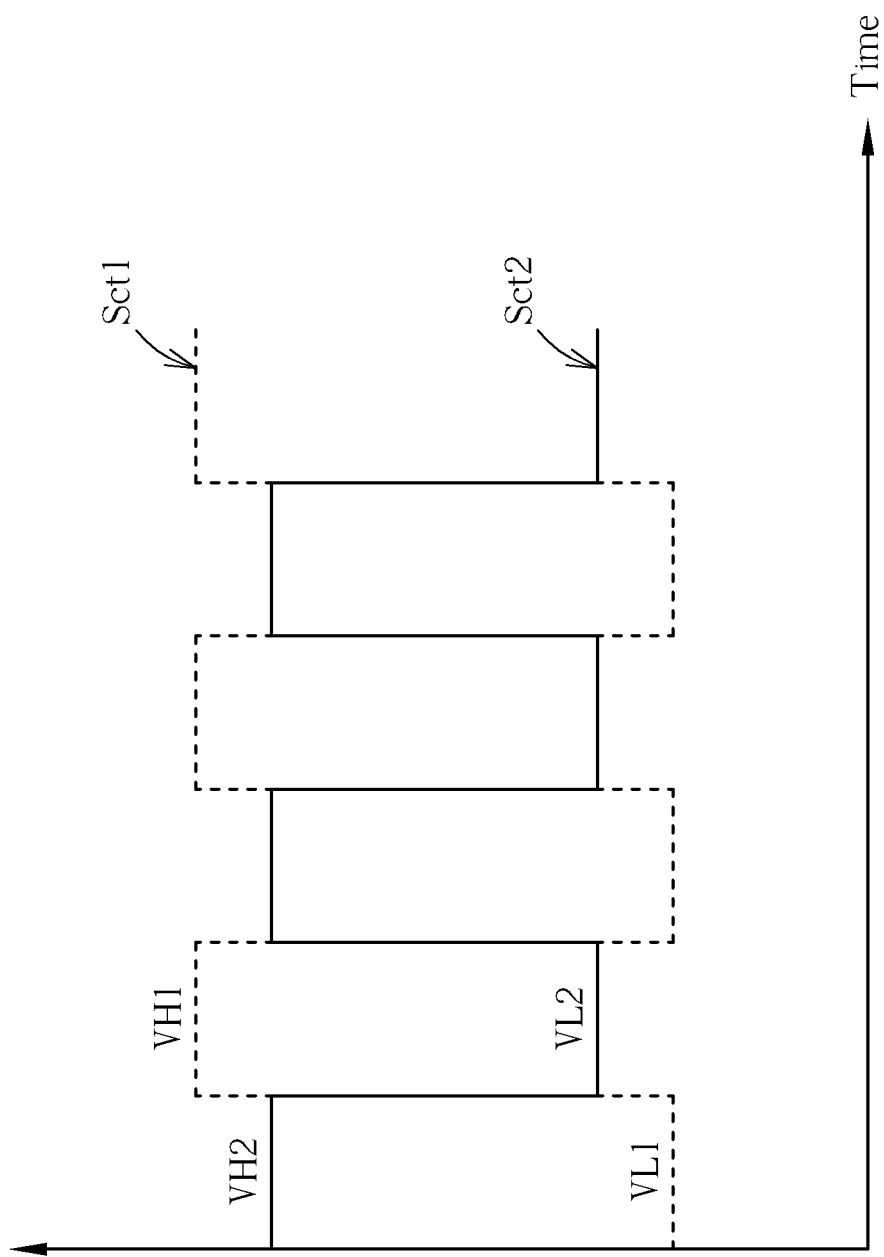
FIG. 5 is a schematic diagram showing the waveforms of the first control signal Sct1 and the second control signal Sct2 generated by the control unit illustrated in FIG. 1 and FIG. 2 based on a third driving method of the present invention, having time along the abscissa.

FIG. 5 is a schematic diagram showing the waveforms of the first control signal Sct1 and the second control signal Sct2 generated by the control unit 150 illustrated in FIG. 1 and FIG. 2 based on a third driving method of the present invention, having time along the abscissa. As shown in FIG. 5, when the first control signal Sct1 is switched from a first low voltage VL1 to a first high voltage VH1 in a rapid-shift manner, the second control signal Sct2 is switched from a second high voltage VH2 to a second low voltage VL2 also in a rapid-shift manner. Alternatively, when the first control signal Sct1 is switched from the first high voltage VH1 to the first low voltage VL1 in a rapid-shift manner, the second control signal Sct2 is switched from the second low voltage VL2 to the second high voltage VH2 also in a rapid-shift manner. In the embodiment shown in FIG. 5, the second high voltage VH2 may be substantially identical to the first high voltage VH1, and the second low voltage VL2 may be substantially identical to the first low voltage VL1. That is, the first control signal Sct1 and the second control signal Sct2 may be square-wave signals having phases opposite to each other, and therefore the voltage swings of the first control signal Sct1 and the second control signal Sct2 may be significantly reduced for mitigating the interference with the operation of the touch sensing panel 130 as well as for saving power consumption. Depending on the performance of liquid crystals, the polarity inversion operation can be performed in either blanking time or other time.

In conclusion, regarding the autostereoscopic display device having touch sensing mechanism and the driving method thereof according to the present invention, the first and second control signals provided by the control unit of the autostereoscopic display device are able to avoid an occurrence of serious transient alternating electric field capable of interfering with the operation of the touch sensing mechanism, for improving the reliability of a touch event detecting operation performed by the touch sensing mechanism.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

What is claimed is:

1. An autostereoscopic display device having touch sensing mechanism, comprising:
   a display panel for illustrating images;
   a touch sensing panel for detecting touch events;
   a 2D/3D switching panel, disposed between the display panel and the touch sensing panel, the 2D/3D switching panel having a first substrate, a first electrode disposed on a first panel surface of the first substrate, a second substrate opposing to the first substrate, and a second electrode disposed on a first panel surface of the second substrate; and
   a control unit, electrically connected to the first and second electrodes, for providing a first control signal and a second control signal furnished to the first and second electrodes respectively, wherein the first control signal is switched between a first high voltage and a first low voltage in a gradual-shift manner;
   wherein the first control signal received at the first electrode is pulled from the first low voltage upward to a first intermediate voltage between the first high voltage and the first low voltage during a first interval; the first control signal received at the first electrode is pulled from the first intermediate voltage upward to a second intermediate voltage between the first high voltage and the first intermediate voltage during a second interval following the first interval; the first control signal received at the first electrode is pulled from the second intermediate voltage upward to a third intermediate voltage between the first high voltage and the second intermediate voltage during a third interval following the second interval; and the first control signal received at the first electrode is pulled from the third intermediate voltage upward to the first high voltage during a fourth interval following the third interval.

2. The autostereoscopic display device of claim 1, wherein the first and second electrodes are transparent conductive electrodes formed by indium tin oxide (ITO) material.

3. The autostereoscopic display device of claim 1, further comprising:
   a lenticular lens panel with a liquid crystal polymer (LCP) layer, disposed between the touch sensing panel and the 2D/3D switching panel.

4. The autostereoscopic display device of claim 1, further comprising:
   a first polarizer disposed on a second panel surface of the first substrate; and
   a second polarizer disposed on a second panel surface of the second substrate.

5. The autostereoscopic display device of claim 1, wherein the second control signal is switched between a second high voltage and a second low voltage in a gradual-shift manner.

6. The autostereoscopic display device of claim 5, wherein the second high voltage is substantially identical to the first high voltage, and the second low voltage is substantially identical to the first low voltage.

7. The autostereoscopic display device of claim 5, wherein the second control signal is gradually shifted from the second high voltage to the second low voltage as the first control signal is gradually shifted from the first low voltage to the first high voltage.

8. The autostereoscopic display device of claim 1, wherein the second control signal is switched between a second high voltage and a second low voltage in a rapid-shift manner.

9. The autostereoscopic display device of claim 8, wherein the second control signal is rapidly shifted from the second low voltage to the second high voltage as the first control signal is gradually shifted from the first low voltage to the first high voltage.

10. An autostereoscopic display driving method adaptive for use in an autostereoscopic display device having touch sensing mechanism, the autostereoscopic display device comprising a display panel for illustrating images, a touch sensing panel for detecting touch events, and a 2D/3D switching panel disposed between the display panel and the touch sensing panel, the 2D/3D switching pane having a first substrate, a first electrode disposed on the first substrate for receiving a first control signal, a second substrate opposing to the first substrate, and a second electrode disposed on the second substrate for receiving a second control signal, the autostereoscopic display driving method comprising:
   switching the first control signal between a first high voltage and a first low voltage in a gradual-shift manner; and
   switching the second control signal between a second high voltage and a second low voltage in a gradual-shift or rapid-shift manner;
   wherein the step of switching the first control signal between the first high voltage and the first low voltage in the gradual-shift manner comprises:
      pulling the first control signal received at the first electrode from the first low voltage upward to a first intermediate voltage between the first high voltage and the first low voltage during a first interval;
      pulling the first control signal received at the first electrode from the first intermediate voltage upward to a second intermediate voltage between the first high voltage and the first intermediate voltage during a second interval following the first interval;
      pulling the first control signal received at the first electrode from the second intermediate voltage upward to a third intermediate voltage between the first high voltage and the second intermediate voltage during a third interval following the second interval; and
      pulling the first control signal received at the first electrode from the third intermediate voltage upward to the first high voltage during a fourth interval following the third interval.

11. The autostereoscopic display driving method of claim 10, wherein:
    the step of switching the second control signal between the second high voltage and the second low voltage in the gradual-shift or rapid-shift manner comprises:
       pulling the second control signal from the second low voltage upward to the second high voltage during the third interval.

12. The autostereoscopic display driving method of claim 10, wherein the second high voltage is substantially identical to the first high voltage, and the second low voltage is substantially identical to the first low voltage.

13. The autostereoscopic display driving method of claim 12, wherein:
    the step of switching the second control signal between the second high voltage and the second low voltage in the gradual-shift or rapid-shift manner comprises:
       pulling the second control signal from the second high voltage downward to the third intermediate voltage during the first interval;
       pulling the second control signal from the third intermediate voltage downward to the second intermediate voltage during the second interval;
       pulling the second control signal from the second intermediate voltage downward to the first intermediate voltage during the third interval; and pulling the second control signal from the first intermediate voltage downward to the second low voltage during the fourth interval.

* * * * *